Feb. 10, 1959 W. E. PRATT ET AL 2,873,127
MECHANICAL SEAL
Filed March 1, 1956
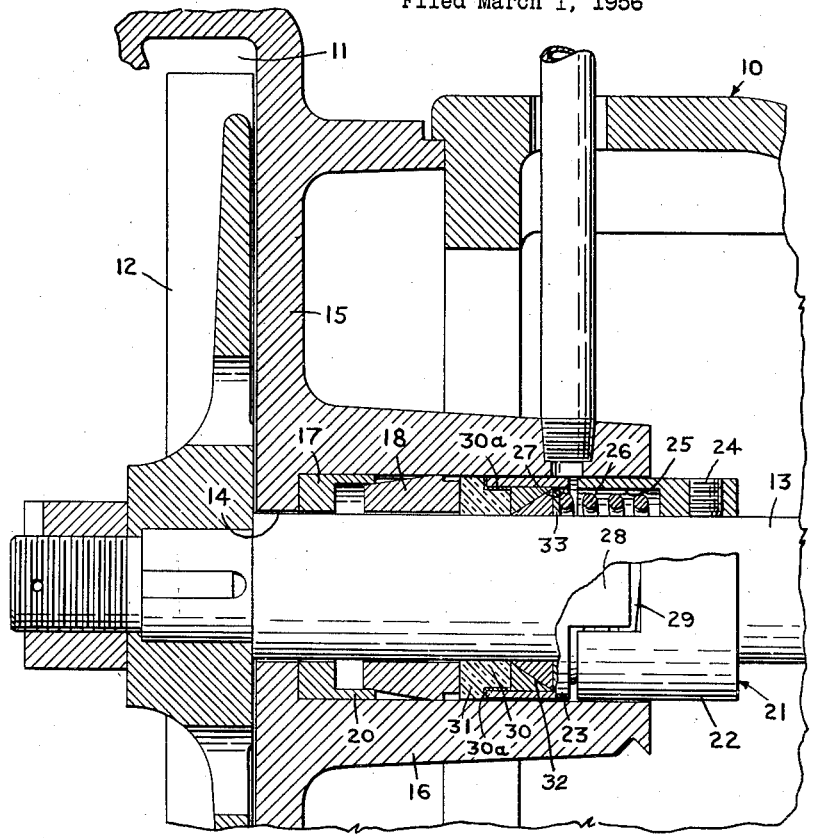
WARD E. PRATT, DECEASED
BY M. MARGUERITE PRATT, EXECUTRIX
CHARLES L. FARR, DECEASED
BY CHARLES L. FARR, JR. EXECUTOR
BY Daniel A. Bobb
atty

United States Patent Office 2,873,127
Patented Feb. 10, 1959

2,873,127

MECHANICAL SEAL

Ward E. Pratt, deceased, late of West Orange, N. J., by M. Marguerite Pratt, executrix, Sedalia, Colo., and Charles L. Farr, deceased, late of Mountainside, N. J., by Charles L. Farr, Jr., executor, Basking Ridge, N. J., assignors to Worthington Corporation, Harrison, N. J., a corporation of Delaware Application March 1, 1956, Serial No. 568,807

1 Claim. (Cl. 286—11.15)

The present invention relates to a mechanical seal and a method of making the same.

The present application is a continuation, in part, of application U. S. Ser. No. 481,512, filed January 13, 1955, now abandoned.

The present invention provides a mechanical seal in which there are stator elements and rotor elements, the rotor elements are fixed on a rotatable shaft and engage the stator elements so as to prevent them from rotating without requiring any additional clamping means to maintain them stationary as is shown in Patent No. 2,436,866. In addition, the rotor elements maintain the stator elements positioned against the body in which they are disposed to provide a liquid tight seal therefor.

In accordance with the present invention the stator elements comprise two annular sealing members, one of which engages the body to be sealed and the other member of which engages the first sealing member, the liquid tight seal being effected by the rotor element exerting an axial force against the stator elements through an insert member pressed into the rotor element.

The present invention provides an insert member in the rotor element of a mechanical seal which is made of inert brittle material having long wearing characteristics and which is non-corrosive thereby permitting the insert member to be used with toxic and corrosive materials over a long period of time reducing maintenance and cost in the apparatus in which it is used.

The present invention further provides an insert member for the rotor element of a mechanical seal which may be positioned therein in a fluid tight manner without breakage thereof during assembly of the rotor element.

The present invention further provides the method of positioning and a brittle insertable member in the rotor element of a mechanical seal. The insert member is inserted in its rotor element by first positioning a resilient gasket member over the surface of the rotor element adjacent which the insert member is to be positioned and thereafter inserting the insert member which has a diameter of slightly smaller dimension than the diameter of the rotor element into the rotor element and pressing it against the gasket member so that the resilient gasket member conforms to fit the dimensions of the rotor element and the insert member without cracking or breaking it. Thus the insert member is tightly compressed into the rotor element so that it forms a liquid tight joint therewith and at the same time prevents relative movement between the insert member and the rotor element so said insert member rotates therewith.

The invention will be better understood when considered in connection with the following description and drawing forming a part thereof and in which:

Figure 1 is a fragmentary view, partly in section, of a pump shown for purposes of illustration, embodying the sealing means of the present invention.

Referring to the drawing, the reference numeral 10 designates the casing of housing or a pump having a liquid-containing vessel 11 in which is disposed an impeller 12 fixed to a horizontally extending shaft 13. Shaft 13 extends through an opening 14 in the wall 15 of the vessel and the axial bore of a portion of the wall forming a hub-shaped extension or sleeve 16 forming a stuffing box in alignment with the wall opening. The shaft and impeller in vessel 11 are rotated or driven by any suitable means (not shown). Annular sealing members or rings 17 and 18 fit loosely on shaft 13, as shown in an exaggerated manner in Figure 1. Ring 17 fits snugly within the axial bore of sleeve 16 and abuts the outside of wall 15. The outer periphery of ring 17 terminates in an axially extending circumferential portion 20 abutting the inner surface of sleeve 16. Ring 18 is positioned adjacent ring 17 in sleeve 16 with its outer surface engaging the inner surface of circumferential portion 20 of ring 17. The outer surface of ring 18 is inwardly inclined or tapered in a direction toward wall 15. Preferably the angle of inclination or taper, measured from a horizontal reference line, is between 4° and 7½° to provide an optimum seal or fluid tight relationship between the contacting surfaces of the rings and between the outer surface of ring portion 20 and inner surface of sleeve 16 to be hereinafter described. It will be understood that the friction factor between the particular type materials of the annular sealing members of the mechanical seal, the limitation of axial movement of the sealing members, and the force that can be exerted by the back-up body of the mechanical seal will control the angle of inclination or taper of the abutting or contacting surfaces of these sealing members to produce the desired result.

The back-up body or rotor element 21, positioned in sleeve 16 and bearing or pressing against the vertical face of sealing ring 18 away from vessel wall 15, comprises a cylindrically-shaped back-up member or portion 22 and a cylindrically-shaped collar 23 machined to fit loosely within sleeve 16, as shown in an exaggerated manner in Figure 1. The outer end of portion 22 is machined to fit shaft 13 and carry a set screw 24 by which it is fixedly attached to the shaft for rotation therewith. An axial bore 25 having a somewhat larger diameter than the shaft is provided in the inner end of portion 22. A spring member 26 which fits around shaft 13 is disposed in bore 25. An axial bore 27 also of a somewhat larger diameter than shaft 13, extends through collar 23.

Collar 23 is positioned on shaft 13 between ring 18 and portion 22. Fingers or tongues 28 on collar 23 extend into corresponding slots 29 on the adjacent end of portion 22 to prevent relative rotative movement between the portion 23 and shaft 13.

The insert member of the present invention comprises an annular insert member 30 provided with a peripheral flange 31 thereon. Insert 30 is made of a brittle inert material such as ceramic having a long wearing quality and being non-corrosive. It is positioned within the end of collar 23 and has only the flange 31 thereon extending beyond the collar end. A resilient and deformable L-shaped annular gasket 30a is provided for maintaining the insert tightly compressed in the collar so that it forms a liquid tight joint and at the same time prevents relative movement with respect thereto.

To position insert 30 within the collar, the gasket 30a is first disposed therein with its shorter leg engaging the edge of the collar. The brittle insert has a slightly smaller diameter than the internal collar diameter. To avoid failure of the insert when a force is applied, it is inserted within the end of the gasket and pressed home into the collar. The thin gasket provides the necessary resiliency and conforms to fit the dimensions of the insert and collar so that the insert will not crack or break.

Wedge-shaped packing 32 is disposed in the other end of bore 27 adjacent the end of insert 30 therein. An annular compression plate or ring 33 is positioned adjacent packing 32 and held in a pressing relationship therewith by compression spring 26.

The sealing means of the present invention is assembled by positioning ring 17 on shaft 13 to abut wall 15 with the circumferential portion 20 away from the wall. Ring 18 is positioned on the shaft adjacent ring 17 with its tapered surface extending into the recess formed by portion 20 and in contact with the inner surface of the circumferential portion. Collar 23 is positioned on shaft 13 with flange 31 of insert 30 in contact with the outer edge of ring 18. Deformable wedge-shaped packing rings 32 are disposed on shaft 13 in axial bore 27 in contact with the portion of insert 30 extending therein. Compression plate 33 is placed on shaft 13 in contact with packing 32. Compression spring 26 is arranged on the shaft with one end in contact with plate 33. Back-up portion 22 is positioned on the shaft adjacent collar 23 with fingers 28 extending into slots 29 and a portion of spring 26 disposed in axial bore 25. Portion 22 is fixed for non-rotative movement with respect to shaft 13 by threading set screw 24 inwardly in the recess provided therefor and against the periphery of the shaft. Collar 23 is fixed for non-rotative movement with respect to the shaft and portion 22 through fingers 28 which extend into slots 29 of portion 22. However, this finger and slot attachment permit axial movement of the collar with respect to the shaft and portion 22, as shown by the exaggeration in Figure 1. Insert 30, in turn, is prevented from rotating with respect to the shaft by being fixed to the axial bore 27 of the collar by pressing swaggering or similar means. Thus, only rotary motion of shaft 13 causes rotation of portion 22, collar 23, and insert 30.

The back-up member is fixed axially on shaft 13 to provide an axial thrust or load against the sealing rings and vessel wall. This is accomplished by fixing portion 22 on the shaft to compress spring 26 between plate 33 and the bottom of axial bore 25 thereby maintaining a tension or force in the spring of predetermined value. This spring tension or pressure is transmitted through plate 33, wedge-shaped packing 32 and collar insert 30 to rings 17 and 18 and the vessel wall. This spring pressure forces ring 17 against wall 15 and ring 18 into the recess formed by circumferential portion 20 of ring 17, with the outer surface of ring 18 engaging the inner surface of ring 17 and forcing portion 20 radially outwardly against the periphery of sleeve 16. Thus, in the present invention, ring portion 20 is pinched between outer ring 18 and sleeve 16 and prevents fluid in vessel 11 from leaking between the two sealing rings, and ring 17 is forced against wall 15 to prevent fluid from leaking between the vessel wall and said sealing ring. Pressure of spring 26 on wedge packing rings 32 forces them to spread radially against the shaft and the inside of collar 23 to prevent any leakage of fluid from vessel 11 along shaft 13 from passing beyond these packing rings.

Sealing rings 17 and 18 are maintained stationary with respect to shaft 13 due to the force of the spring pressure that is transmitted to the rings through insert 30 and which holds ring 17 in contact with wall 15 and sleeve 16 and holds ring 18 in contact with ring portion 20. Thus, in the present invention no clamping means is required to maintain the sealing means stationary. The rings are made preferably of Teflon or carbon or similar non-corrosive, high elasticity and low friction materials. Also, since there is a substantially large area of contact between the peripheral flange 31 of the rotating element in the present invention and the vertical face of stationary sealing ring 18, leakage is prevented immediately between the rotating and stationary elements without a running in period to permit lapping of these parts in order to avoid leakage therebetween.

Inasmuch as various changes may be made in the different parts of the apparatus herein described without departing from the spirit of the invention, the invention is not to be considered limited thereto, except by the scope of the following claim.

What is claimed is:

In a seal for a rotatable shaft which extends through an axial opening in a wall of a liquid-containing vessel and through an axial counterbore in a sleeve formed integral with said wall, said seal comprising two stationary sealing rings disposed about the shaft in the sleeve counterbore adjacent the vessel wall, one of said sealing rings having a laterally extending circumferential portion forming a recess therein and the other sealing ring having a tapered outer surface extending into the said recess, a seal rotor element including a back-up member fixedly connected to the shaft at a prescribed distance from the sealing rings, an axially slidable annular collar detachably connected to the back-up member for rotation therewith, a deformable gasket and ceramic insert element disposed in a force fit in an axial bore in said collar for rotation therewith, said gasket being disposed between the ceramic insert element and collar to form a fluid-tight seal, an annular flange formed in an end of the ceramic insert element adapted to engage with the stationary sealing ring nearest to it, and flexible means disposed between the back-up member and annular collar to bias the said annular flange against the said stationary sealing ring, whereby the said laterally extending circumferential portion of the one sealing ring is forced radially outward and the tapered outer surface of the other sealing ring forced radially inward, each in sealing engagement with respectively adjacent elements.

References Cited in the file of this patent

UNITED STATES PATENTS

| | | |
|---|---|---|
| 1,926,007 | Kohler | Sept. 5, 1933 |
| 2,425,209 | Snyder et al. | Aug. 5, 1947 |
| 2,432,576 | Koffer | Dec. 16, 1947 |
| 2,436,866 | Lancaster | Mar. 2, 1948 |
| 2,670,973 | Ginther et al. | Mar. 2, 1954 |

FOREIGN PATENTS

| | | |
|---|---|---|
| 695,087 | Great Britain | Aug. 5, 1953 |
| 995,663 | France | Aug. 22, 1951 |
| 1,054,739 | France | Oct. 7, 1953 |